United States Patent
Yokoyama et al.

(10) Patent No.: US 9,890,222 B2
(45) Date of Patent: Feb. 13, 2018

(54) POLYARYLENE SULFIDE PRODUCTION DEVICE PROVIDED WITH BAFFLE AND BAFFLE SUPPORT

(71) Applicant: Kureha Corporation, Tokyo (JP)

(72) Inventors: Ryuichi Yokoyama, Tokyo (JP); Kohta Koichi, Tokyo (JP); Michihisa Miyahara, Tokyo (JP); Masanori Kobayashi, Tokyo (JP); Koichi Suzuki, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 15/513,507

(22) PCT Filed: Sep. 18, 2015

(86) PCT No.: PCT/JP2015/076778
§ 371 (c)(1),
(2) Date: Mar. 22, 2017

(87) PCT Pub. No.: WO2016/047631
PCT Pub. Date: Mar. 31, 2016

(65) Prior Publication Data
US 2017/0313790 A1    Nov. 2, 2017

(30) Foreign Application Priority Data

Sep. 22, 2014  (JP) .................................. 2014-192648

(51) Int. Cl.
*B01J 19/18*  (2006.01)
*C08F 2/01*   (2006.01)
(Continued)

(52) U.S. Cl.
CPC .............. *C08F 2/01* (2013.01); *C08F 2/001* (2013.01); *C08F 2/002* (2013.01); *C08F 2/06* (2013.01); *C08G 75/14* (2013.01)

(58) Field of Classification Search
CPC ...................... B01J 19/18; B01J 19/006; B01J 2208/00221; B01J 4/005; C08F 2/001;
(Continued)

(56) References Cited

U.S. PATENT DOCUMENTS

| 4,645,826 A | 2/1987 | Iizuka et al. |
| 4,767,841 A | 8/1988 | Goetz et al. |
| 4,812,539 A | 3/1989 | Iizuka et al. |

FOREIGN PATENT DOCUMENTS

| JP | S453368 B1 | 2/1970 |
| JP | S6339926 A | 2/1988 |

(Continued)

OTHER PUBLICATIONS

International Search Report for PCT/JP2015/076778 dated Nov. 17, 2015.

*Primary Examiner* — Shane Fang
(74) *Attorney, Agent, or Firm* — Birch, Stewart, Kolasch & Birch, LLP

(57) ABSTRACT

The PAS production device of the present invention is a PAS production device provided with a reaction vessel equipped with one or a plurality of baffles; each baffle being supported by one or a plurality of baffle supports provided in a protruding manner on an inside wall of the reaction vessel; and at least one of the baffle supports having one or a plurality of openings preferably passing through the baffle support in the vertical direction.

13 Claims, 4 Drawing Sheets

(51) Int. Cl.
*C08F 2/00* (2006.01)
*C08F 2/06* (2006.01)
*C08G 75/14* (2006.01)

(58) Field of Classification Search
CPC . C08F 2/002; C08F 2/06; C08G 75/14; C08G 75/0263; C08G 75/0268; C08G 75/0259; C08G 75/025
See application file for complete search history.

(56) References Cited

FOREIGN PATENT DOCUMENTS

| | | |
|---|---|---|
| JP | 4-114036 A | 4/1992 |
| JP | H04114036 A | 4/1992 |
| JP | 5-59782 B2 | 8/1993 |
| JP | H0559782 B2 | 8/1993 |
| JP | H06107332 A | 4/1994 |
| JP | H0651793 B2 | 7/1994 |
| JP | 2011083692 A1 | 4/2011 |
| JP | 2012-183491 A | 9/2012 |
| JP | 2012183491 A1 | 9/2012 |

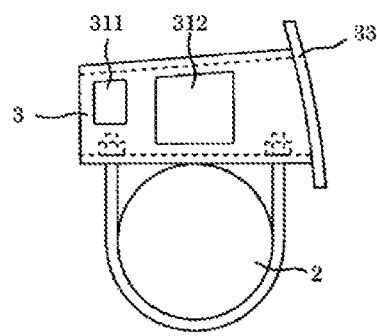
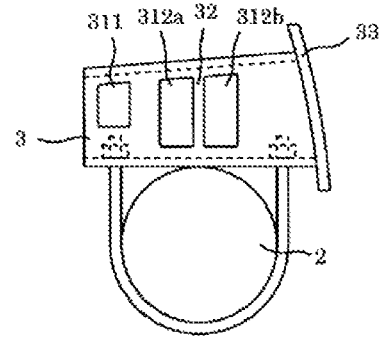
FIG. 3A             FIG. 3B
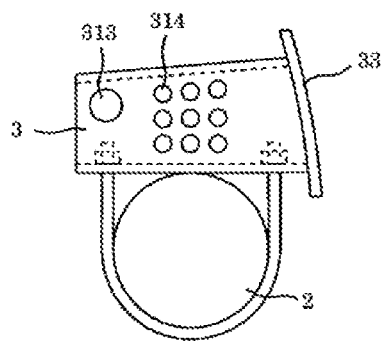
FIG. 3C
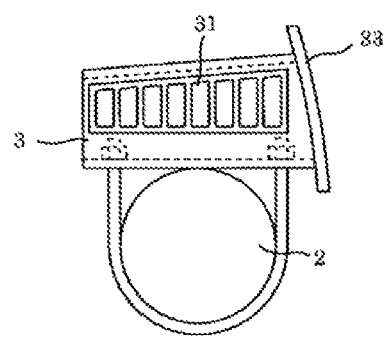
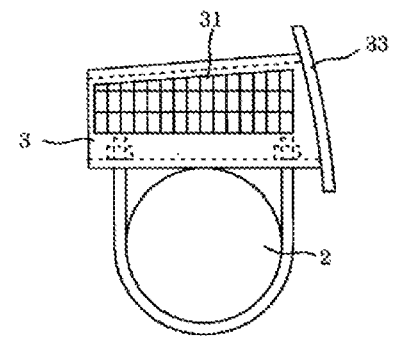
FIG. 3D             FIG. 3E

POLYARYLENE SULFIDE PRODUCTION DEVICE PROVIDED WITH BAFFLE AND BAFFLE SUPPORT

TECHNICAL FIELD

The present invention relates to a polyarylene sulfide production device, and more particularly to the improvement of a polyarylene sulfide production device provided with a baffle (also called a "baffle board") and a baffle support disposed inside a reaction vessel for the purpose of enhancing stirring efficiency or the like.

BACKGROUND ART

Polyarylene sulfide (also called "PAS" hereinafter), represented by polyphenylene sulfide (also called "PPS" hereinafter), is an engineering plastic having excellent heat resistance, chemical resistance, flame retardancy, mechanical strength, electrical characteristics, dimensional stability, and the like. PAS has been widely used in a wide variety of fields, such as electric/electronic devices and devices for automobiles, since PAS can be formed into various molded products, films, sheets, fibers, and the like by ordinary melt processing methods, such as extrusion molding, injection molding, and compression molding.

A known representative production method for PAS is a method of obtaining PAS such as PPS by performing a polymerization reaction on a sulfur source and a dihalo aromatic compound such as p-dichlorobenzene (also called "PDCB" hereafter) while heating (for example, temperature conditions of approximately 175 to 350° C.) using a mixture containing a polar organic solvent such as N-methyl-2-pyrrolidone (also called "NMP" hereafter) (Patent Documents 1 and 2). Other known methods for producing PAS with a high molecular weight include a two-stage polymerization method of performing a polymerization reaction while changing the polymerization temperature and the water content present in the polymerization reaction system, and a method of performing polymerization using a phase separation agent as necessary (Patent Documents 3 and 4).

A roughly cylindrical reaction vessel (also called a "polymerization vessel" or a "polymerization can") equipped with a stirring device is often used as a PAS polymerization device. It is necessary to precisely control the compositions of the polar organic solvent, the raw material monomers, and the generated PAS polymer inside the polymerization device, specifically, inside the reaction vessel. Therefore, PAS polymerization is performed by using a reaction vessel provided with a mixing impeller, supplying raw material monomers, a solvent (polar organic solvent, water, or the like), a polymerization aid, and the like from one or a plurality of supply tubes provided at the top part of the reaction vessel, adjusting the inside of the reaction vessel to a prescribed temperature and pressure and changing the temperature and pressure as necessary, additionally supplying raw material monomers, a solvent, or the like, and performing a polymerization reaction while sufficiently stirring. The produced PAS polymer is extracted from a discharge tube ordinarily provided at the base of the reaction vessel, and a PAS polymer product is obtained via washing, purification, or the like.

At the time of stirring in the roughly cylindrical vessel, it is known that a co-rotation phenomenon occurs, wherein a liquid current rotates in the form of a vortex along the vessel wall as the mixing impeller rotates. When the co-rotation phenomenon occurs, the rotation flow in the circumferential direction becomes dominant, and the liquid current in the vertical direction becomes difficult to generate, which makes it difficult to homogenize the composition of the stirred matter inside the vessel or to uniformly mix the stirred content. In this case, a forced vortex (forced vortex zone) which co-rotates together with the mixing impeller and a free vortex on the outside thereof are formed, so a pressure difference arises between the central part of the vessel and the vessel walls, which causes a cavity to be formed in the central part of the liquid surface. Therefore, a baffle (baffle board) is often inserted to convert the rotation flow in the circumferential direction to a vertical circulation by obstructing flow in the circumferential direction. The insertion of a baffle (baffle board) generates a vertical circulation together with the rotation flow in the circumferential direction. As a result, it is possible to realize the enhancement of stirring efficiency (increase in the stirring power number, enhancement of shear performance, or the like), the formation of a prescribed flow pattern, and the securing of heating surface area, which makes it possible to achieve the homogenization of the composition of the stirred matter or the uniform mixing of the stirred matter, the homogenization of a prescribed reaction, or the like.

In many cases, a member in the shape of a flat plate, a rod, or the like extending in the vertical direction of the vessel parallel to the vessel walls in close proximity to the vessel walls is used as a baffle (baffle board). It is known that the mixing effect or the like differs as a result of changing conditions such as the shape or size (width, diameter, length, or the like) of the baffle, the length below the liquid surface (also called the "interface"), and the gap relative to the vessel wall. In addition, a passage for a coolant or a heating medium may also be provided inside a baffle (baffle board) so that the baffle may be used as a temperature adjustment device. The following are known methods of attaching a baffle (baffle board): (1) fixing a baffle to the body portion of the vessel by welding or the like; (2) fixing a baffle with an attachment fitting provided in the vessel (also called a "baffle support" or a "baffle support part"); and (3) suspending and fixing a baffle with a nozzle or the like provided on the lid of the vessel (Patent Documents 5 and 6). Patent Document 5, for example, discloses: that in the case of (1), welding or cutting of the welded part is necessary in order to attach or replace the baffle board, so the number of operation man-hours is high, and the operation time also becomes long; that in the case of (2), the replacement or the like of the baffle board is easy, but attachment fittings must be additionally provided by welding or the like in order to increase the number of baffle boards installed, which leads to problems in that the number of operation man-hours becomes high; and that in the case of (3), it is not possible to provide a greater number of baffle boards than the number of nozzles, and since the force applied to the baffle boards is supported by the lid, there are problems in that the usage conditions are restricted.

In a PAS production device, deposits may accumulate in step with the stirring operation or the like inside the reaction vessel. The composition of deposits primarily consists of a PAS polymer as a product and NaCl as a by-product, but low polymers of PAS (including oligomers or the like) or unreacted raw material monomers or alkaline substances (NaOH or the like) may also be contained. As the accumulation of deposits on the baffle, the baffle support, the supply tubes, or the like progresses, the accumulated deposits may peel and drop off, and the deposits may be mixed in the resulting PAS product, which may lead to a reduction in quality or may inhibit the discharge of PAS from the reaction vessel.

Further, when the deposits come into contact with high concentrations of alkaline substances at high temperatures, there is also a risk that the corrosion of the device (supply tubes, vessel walls, or the like) may occur. The accumulation of deposits becomes more prominent as the number of polymerization batches is increased. Thus, it is necessary to periodically stop the polymerization reaction completely and devote an excessive amount of labor and time to cleaning the reaction vessel (removal of deposits or the like).

Therefore, there is a demand to provide a PAS production device which suppresses the accumulation of deposits on a baffle (baffle board) or the like disposed inside a reaction vessel via a baffle support for the purpose of enhanced stirring efficiency or the like, thereby contributing to enhanced production efficiency, reduced cost of removing accumulation, and enhanced quality of the PAS product.

CITATION LIST

Patent Literature

Patent Document 1: Japanese Examined Patent Application Publication No. S45-3368A
Patent Document 2: Japanese Examined Patent Application Publication No. H6-51793A
Patent Document 3: Japanese Unexamined Patent Application Publication No. S61-7332A
Patent Document 4: Japanese Unexamined Patent Application Publication No. S63-39926A
Patent Document 5: Japanese Unexamined Patent Application Publication No. 2011-83692A
Patent Document 6: Japanese Examined Patent Application Publication No. H5-59782A

SUMMARY OF INVENTION

Technical Problem

An object of the present invention is to provide a PAS production device which suppresses the accumulation of deposits on a baffle (baffle board) or the like disposed inside a reaction vessel via a baffle support for the purpose of enhanced stirring efficiency or the like, thereby contributing to enhanced production efficiency, reduced cost of removing accumulation, and enhanced quality of the PAS product.

Solution to Problem

As a result of conducting dedicated research in order to achieve the object described above, the present inventors discovered that the problems described above can be solved by providing a unit having an opening passing through the unit as a baffle support in a PAS production device equipped with a baffle and a baffle support, thereby completed the present invention.

That is, the present invention provides (1) a PAS production device provided with a reaction vessel equipped with one or a plurality of baffles;
each baffle being supported by one or a plurality of baffle supports provided in a protruding manner on an inside wall of the reaction vessel; and
at least one of the baffle supports having one or a plurality of openings passing through the baffle support.

In addition, the present invention provides the PAS production devices of (2) to (13) below as specific aspects of the invention.

(2) The PAS production device according to (1) including a reaction vessel equipped with a plurality of baffles.
(3) The PAS production device according to (1) or (2), wherein a cross-sectional area in a horizontal plane of at least one of the baffle supports is greater than a cross-sectional area in a vertical plane with respect to a direction of flow in a horizontal direction of a content of the reaction vessel.
(4) The PAS production device according to any one of (1) to (3), wherein the opening passing through the baffle support is an opening passing through the baffle support in a vertical direction.
(5) The PAS production device according to any one of (1) to (4), wherein a total area of an opening end of the opening passing through the baffle support is a ratio of from 5 to 95% of an area enclosed by a contour of a surface including the opening end out of the surface of the baffle support.
(6) The PAS production device according to any one of (1) to (5), wherein the plurality of intervals is from 1 to 50 mm.
(7) The PAS production device according to any one of (1) to (6), wherein the openings passing through the baffle support have a ladder shape or a lattice shape.
(8) The PAS production device according to any one of (1) to (7), wherein the baffle support is disposed on a downstream side with respect to a flow in a horizontal direction of the content inside the reaction vessel using a geometric center of gravity of a horizontal cross section of the baffle as a reference.
(9) The PAS production device according to any one of (1) to (8), wherein at least one of the baffles has a pointed head with a vertex angle of from 45 to 75 degrees on an upper end thereof.
(10) The PAS production device according to any one of (1) to (9), wherein a cross-sectional shape perpendicular to a lengthwise direction of each baffle is a roughly circular or elliptical shape.
(11) The PAS production device according to any one of (1) to (10), wherein a length in a radial direction of the reaction vessel of a cross section perpendicular to a lengthwise direction of each baffle is from 0.4 to 15% of a diameter of the reaction vessel.
(12) The PAS production device according to any one of (1) to (11), wherein a length of each baffle is from 50 to 80% of a height of the reaction vessel.
(13) The PAS production device according to any one of (1) to (12), wherein at least one of the baffles includes a cooling tube or a heating tube therein.
(14) A PAS production method using the PAS production device described in any one of (1) to (13).

Advantageous Effects of Invention

The present invention is a PAS production device including a reaction vessel equipped with one or a plurality of baffles;
each baffle being supported by one or a plurality of baffle supports provided in a protruding manner on an inside wall of the reaction vessel; and
at least one of the baffle supports having one or a plurality of openings passing through the baffle support.
This yields the effect that it is possible to provide a PAS production device in which the accumulation of deposits on a baffle (baffle board) or the like disposed inside the reaction vessel via a baffle support for the purpose of enhanced stirring efficiency is suppressed, thereby contributing to enhanced production efficiency, reduced cost of removing accumulation, and enhanced quality of the PAS product.

BRIEF DESCRIPTION OF THE DRAWINGS

FIGS. 3A to 3E are schematic partial cross-sectional plan views illustrating several specific examples of the baffle and baffle support provided in the PAS production device of the present invention.

DESCRIPTION OF EMBODIMENTS

Figure 1:
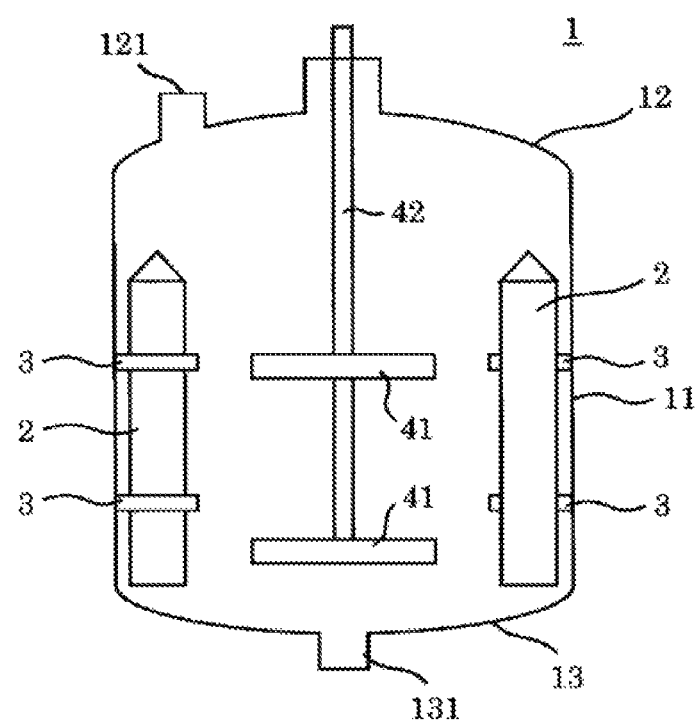
FIG. 1 is a schematic cross-sectional front view illustrating a specific example of a reaction vessel provided in the PAS production device of the present invention.

I. Polyarylene Sulfide Production Raw Materials and the Like

The PAS production device of the present invention is a production device for PAS, which is itself publicly known, that is, PAS obtained by performing a polymerization reaction on a polar organic solvent-containing mixture of a sulfur source and a dihalo aromatic compound as raw materials for producing PAS while heating.

1. Sulfur Source:

In the PAS production device of the present invention, the sulfur source used to produce PAS may be a publicly known compound used in the production of PAS. Examples thereof include alkali metal sulfides, alkali metal hydrosulfides, and hydrogen sulfide.

Examples of alkali metal hydrosulfides include lithium hydrosulfide, sodium hydrosulfide, potassium hydrosulfide, rubidium hydrosulfide, cesium hydrosulfide, and mixtures of two or more types thereof. Of these, sodium hydrosulfide and lithium hydrosulfide are preferred from the perspective of being available at low cost for industrial purposes.

Examples of alkali metal sulfides include lithium sulfide, sodium sulfide, potassium sulfide, rubidium sulfide, cesium sulfide, and a mixture of two or more types thereof. The alkali metal sulfide may be in the form of an anhydride, hydrate or aqueous solution. Of these, sodium sulfide is preferred from the perspective of being available at low cost for industrial purposes. Alkali metal sulfides that are commercially available in the form of hydrates may be used as these alkali metal sulfides.

A small amount of alkali metal hydrosulfide may be contained in the alkali metal sulfide. A small amount of alkali metal sulfide may be contained in the alkali metal hydrosulfide. In these cases, the total molar amount of the sulfur source consisting of the alkali metal sulfide and alkali metal hydrosulfide is that of the sulfur source supplied for the polymerization reaction in the polymerization step after the dehydration step implemented where necessary; in other words the "charged sulfur source". When the alkali metal sulfide and alkali metal hydrosulfide are mixed and used, the mixture of the two will be the charged sulfur source.

When the sulfur source contains an alkali metal hydrosulfide, an alkali metal hydroxide is used in combination. Examples of the alkali metal hydroxide include lithium hydroxide, sodium hydroxide, potassium hydroxide, rubidium hydroxide, cesium hydroxide, and a mixture of two or more of these. Of these, sodium hydroxide and lithium hydroxide are preferred from the perspective of being available at low cost for industrial purposes.

2. Dihalo Aromatic Compound:

In the PAS production device of the present invention, the dihalo aromatic compound used to produce PAS may be a publicly known compound used in the production of PAS. Examples thereof include dihalobenzenes such as p-dihalobenzene; alkyl-substituted dihalobenzenes such as o-dihalotoluene, p-dihalotoluene, o-dihaloxylene, and 1-ethyl-2,5-dihalobenzene; aryl-substituted dihalobenzenes such as 1-phenyl-2,5-dihalobenzene; dihalobiphenyls such as 4,4'-dihalobiphenyl; and dihalonaphthalenes such as 1,4-dihalonaphthalene, 1,5-dihalonaphthalene and 2,6-dihalonaphthalene. The dihalo aromatic compound is preferably p-dichlorobenzene (PDCB), which is a p-dihalobenzene having a chlorine atom as the halogen atom.

The amount of the dihalo aromatic compound that is used is ordinarily from 0.9 to 1.5 mol and preferably from 0.95 to 1.2 mol per 1 mol of the sulfur source. When a branching agent described below is used, the total number of moles of the dihalogenated aromatic compound and the branching agent is ordinarily from 0.9 to 1.5 mol and preferably from 0.95 to 1.2 mol per 1 mol of the sulfur source.

3. Polar Organic Solvent:

Preferable examples of the polar organic solvent used as a solvent for the polymerization reaction in order to produce PAS in the PAS production device of the present invention include amide compounds, lactam compounds, urea compounds, organic sulfur compounds, and cyclic organic phosphorus compounds, which are aprotic polar organic solvents.

Specific examples thereof include amide compounds such as N,N-dimethylformamide and N,N-dimethylacetamide; N-alkylcaprolactam compounds such as N-methyl-ε-caprolactam; N-alkylpyrrolidone compounds or N-cycloalkylpyrrolidone compounds such as N-methyl-2-pyrrolidone (NMP) and N-cyclohexyl-2-pyrrolidone; N,N-dialkylimidazolidinone compounds such as 1,3-dialkyl-2-imidazolidinone; tetraalkyl urea compounds such as tetramethyl urea; and hexaalkylphosphoric triamide compounds such as hexamethylphosphoric triamide. In addition, examples organic sulfur compounds include dimethylsulfoxide and diphenylsulfone, and an example of a cyclic organic phosphorus compound includes 1-methyl-1-oxophosphorane.

One type of polar organic solvent may be used alone, or two or more types may be mixed, and the solvents may also be used after being further mixed with other solvent components that do not inhibit the object of the present invention. Of the various aprotic polar organic solvents described above, N-alkylcaprolactam compounds and N-alkylpyrrolidone compounds are preferable, and N-methyl-2-pyrrolidone (NMP) is particularly preferable. The amount of the polar organic solvent that is used is ordinarily in the range of from 0.05 to 10 kg, preferably from 0.1 to 1 kg, more preferably from 0.2 to 0.8 kg, and even more preferably from 0.25 to 0.6 kg per 1 mol of the sulfur source.

4. Molecular Weight Adjusting Agent, Branching/Crosslinking Agent:

In the PAS production device of the present invention, a publicly known molecular weight adjusting agent or branching/crosslinking agent may be used in combination as desired to produce PAS.

5. Polymerization Aid:

In the PAS production device of the present invention, various polymerization aids may be used as necessary in the production of PAS.

6. Phase Separation Agent:

In the PAS production device of the present invention, various phase separation agents may be used to induce phase separation so as to obtain a granular PAS. Phase separation agents are compounds that dissolve in a polar organic solvent either on their own or in the presence of a small amount of water, and reduce the solubility of PAS in a polar organic solvent. The phase separation agent itself is a compound that is not a PAS solvent.

A publicly known compound that is known to function as a phase separation agent may be used as the phase separation agent. Phase separation agents include the compounds used as the above described polymerization aid, but here, "phase separation agent" refers to a compound that can be used in the quantitative ratio that functions as a phase separation agent in a step that implements a polymerization reaction in a phase-separated state, in other words a phase-separated polymerization step, or in the quantitative ratio sufficient to cause phase separation in the present of the phase separation agent after the completion of polymerization. Specific examples of preferable phase separation agents include at least one type selected from the group consisting of organic carboxylic acid metal salts, organic sulfonic acid metal salts, alkali metal halides such as halogenated lithium, alkaline earth metal halides, alkaline earth metal salts of an aromatic carboxylic acid, phosphoric acid alkali metal salts, alcohols, paraffin hydrocarbons, and water. Preferred examples of organic carboxylic acid metal salts include lithium acetate, sodium acetate, potassium acetate, sodium propionate, lithium valerate, lithium benzoate, sodium benzoate, sodium phenyl acetate, and alkali metal carboxylates such as potassium p-tolulate. These phase separation agents may be used alone, or in a combination of two or more types. Of these phase separation agents, either water, which is inexpensive to obtain and easy to post-process, or a mixture of water and an organic carboxylic acid metal salt such as alkali metal carboxylate is particularly preferred.

Even when water is used as the phase separation agent, a phase separation agent in addition to water can be used as a polymerization aid in combination with water, from the perspective of implementing phase-separated polymerization efficiently. When both water and a phase separation agent are used together in phase-separated polymerization, the total amount thereof may be any amount that allows phase separation to be implemented. At least part of the phase separation agent may be contained from the time the polymerization reaction component is prepared, but it is preferable to add the phase separation agent during the polymerization reaction, or to adjust the amount of the phase separation agent to an amount sufficient to form phase separation after the polymerization reaction.

In the PAS production device of the present invention, when the PAS production method is performed in the presence of a phase separation agent, the amount of the phase separation agent that is used differs depending on the type of the phase separation agent. However, the amount is ordinarily in the range of from 0.05 to 30 mol, preferably from 0.1 to 20 mol, more preferably from 0.15 to 15 mol, and even more preferably from 0.2 to 12 mol per 1 kg of the polar organic solvent.

II. Polyarylene Sulfide Production Method

The method for producing PAS by applying the PAS production device of the present invention is not particularly limited as long as the method does not deviate from the gist of the present invention. The method is typically a PAS production method including a charging step and a polymerization step (may also be a two-stage polymerization step consisting of pre-stage polymerization step and a post-stage polymerization step), and preferably a method further including a dehydration step.

1. Dehydration Step

In the production of PAS, a dehydration step of discharging at least a part of a distillate containing water from a system containing a mixture of a polar organic solvent, a sulfur source, and an alkali metal hydroxide as necessary to outside the system by heating the mixture is preferably performed prior to the charging step. The polymerization reaction of the sulfur source and the dihalo aromatic compound is affected by the water content present in the polymerization reaction system. Therefore, typically, the water content in the polymerization reaction system is preferably adjusted by performing the dehydration step before the polymerization step.

In the dehydration step, at least part of a distillate containing water (ordinarily containing water and a polar organic solvent) is discharged from a system containing a mixture of a polar organic solvent, a sulfur source (preferably a sulfur source containing an alkali metal hydrosulfide), and at least a part of the total charged amount of the alkali metal hydroxide to outside the system by heating the mixture preferably in an inert gas atmosphere for ordinarily from 15 minutes to 24 hours and preferably from 30 minutes to 10 hours within a temperature range of ordinarily not higher than 300° C. and preferably from 100 to 250° C. The water content that should be dehydrated during the dehydration step includes hydrated water contained in the raw materials charged in the dehydration step, an aqueous medium of the mixture, water produced by a side reaction between the raw materials, and the like. The dehydration step may be performed using the reaction vessel used to perform the charging step and the polymerization step or using another device but is preferably performed in the reaction vessel.

In the dehydration step, the sulfur source and the water are reacted by heating to produce hydrogen sulfide and an alkali metal hydroxide, thereby volatilizing the gaseous hydrogen sulfide. Accordingly, the amount of the sulfur source in the mixture remaining in the system after the dehydration step decreases relative to the amount of the charged sulfur source. The sulfur source in the mixture remaining in the system after the dehydration step is also called the "effective sulfur source", and the effective sulfur source corresponds to the "charged sulfur source" in the charging step and the subsequent polymerization step (also simply called the "sulfur source" hereafter). The effective sulfur source after the dehydration step is a mixture containing the alkali metal hydrosulfide, the alkali metal sulfide, and the like; and specific form thereof is not particularly limited.

In the dehydration step, water contents such as hydrated water, water medium, and byproduct water, are dehydrated until the content is within the range of the required amount. In the dehydration step, the dehydration is preferably performed until the content becomes preferably 0 to 2 mol, and more preferably from 0.5 to 1.8 mol per 1 mol of the effective sulfur source.

2. Charging Step

The method for producing PAS by applying the PAS production device of the present invention is performed via the following charging step after the dehydration step is performed as desired. The charging step is a step of preparing a charged mixture containing a polar organic solvent, the sulfur source and dihalo aromatic compound described above, and water, wherein a mixture of these prescribed compositions, that is, a charged mixture, is prepared by further adding an alkali metal hydroxide as necessary to the components of the mixture described above.

Charging into the reaction vessel is typically performed in a temperature range of from approximately 20° C. to 300° C. and preferably from approximately 20° C. to 200° C.

The content of the dihalo aromatic compound in the charged mixture is ordinarily a ratio (also called the "charged molar ratio" hereafter) of from 0.9 to 1.5 mol, preferably from 0.92 to 1.2 mol, and more preferably from 0.95 to 1.1 mol per 1 mol of the sulfur source. When the charged molar ratio of the dihalo aromatic compound to the sulfur source is too large, it becomes difficult to produce a high molecular weight PAS. On the other hand, when the charged molar ratio of the dihalo aromatic compound to sulfur source is too small, it becomes easier for a degradation reaction to occur, and difficult to implement a stable polymerization reaction.

In the charging step, it is preferable to prepare a charged mixture containing water in an amount of from 0.02 to 2 mol per 1 mol of the sulfur source, and water is added as necessary so that the mixture contains more preferably from 0.05 to 1.9 mol and even more preferably from 0.5 to 1.8 mol of water.

Further, in the charging step, the amount of the polar organic solvent is ordinarily within the range of from 0.05 to 10 kg, preferably from 0.1 to 1 kg, and more preferably from 0.2 to 0.8 kg per 1 mol of the sulfur source.

3. Polymerization Step

In the method for producing PAS by applying the PAS production device of the present invention, a polymerization step is performed after the charging step. The PAS production device of the present invention may also be applied to the dehydration step described above or a cooling step (granulation step or the like) performed after the polymerization step, but it is preferably applied to the polymerization step following the charging step. In the polymerization step, the charged mixture prepared in the aforementioned charging step is heated typically to a temperature from 170 to 290° C., preferably from 180 to 280° C., and more preferably from 190 to 275° C. before the polymerization reaction is started, in order to progress the polymerization. The polymerization reaction time is typically in the range of from 10 minutes to 50 hours and preferably from 20 minutes to 30 hours.

The PAS polymerization step performed by applying the PAS production device of the present invention is not particularly limited as long as it is a known polymerization step for PAS production methods. For example, the PAS production device of the present invention may be applied to a polymerization step such as one-stage polymerization, two-stage polymerization (consisting of a pre-stage polymerization step and a post-stage polymerization step), or the pre-stage polymerization step or post-stage polymerization step of two-stage polymerization. That is, it is possible to: (1) perform one-stage polymerization, (2) perform the pre-stage polymerization step and post-stage polymerization step of two-stage polymerization, or (3) perform the pre-stage polymerization step or post-stage polymerization step of two-stage polymerization in a reaction vessel having a particular configuration provided in the PAS production device of the present invention. From the perspective of ensuring a large effect of suppressing the accumulation of deposits on a baffle or the like disposed inside the reaction vessel via a baffle support, it is preferable to perform one-stage polymerization or to perform the pre-stage polymerization step of two-stage polymerization in the reaction vessel having a particular configuration provided in the PAS production device of the present invention. In the latter case, a reaction vessel not having the particular configuration described above may be used, or a reaction vessel having the particular configuration described may be used in the post-stage polymerization step of two-stage polymerization. In the latter case, the effect of suppressing the accumulation of deposits on the baffle or the like may be exhibited when transitioning from the polymerization step to the cooling step (granulation step).

Although not essential, as a PAS polymerization step performed by applying the PAS production device of the present invention, the device may also be applied to a polymerization step performed in the presence of a phase separation agent. Specifically, the device may also be applied to a polymerization step of performing a polymerization reaction on the aforementioned dihalo aromatic compound and the sulfur source in the polar organic solvent in a state of being phase-separated into a produced polymer dense phase and a produced polymer dilute phase in the polymerization reaction system in the presence of a phase separation agent. Note that the phase separation agent is preferably water, as described above, or any compound known to function as a phase separation agent. When water is used as a phase separation agent, the amount of water in the polymerization reaction system is adjusted to within the range of from 0.05 to 30 mol, preferably from 0.1 to 20 mol, more preferably from 0.15 to 15 mol, and even more preferably from 0.2 to 12 mol per 1 kg of the polar organic solvent.

As described above, the polymerization reaction may also be performed by two-stage polymerization consisting of a pre-stage polymerization step and a post-stage polymerization step. Specifically, two-stage polymerization may include: a pre-stage polymerization step of initiating a polymerization reaction by heating the charged mixture to a temperature of from 170 to 270° C. so as to produce a prepolymer having a dihalo aromatic compound conversion ratio of not less than 50%, preferably from 50 to 99.5%, and more preferably from 80 to 99.3%; and a post-stage polymerization step of heating the prepolymer to a temperature of from 245 to 290° C. and more preferably to a temperature of from 255 to 285° C. and continuing the polymerization reaction, typically in a state in which water is present in an amount of from 4 to 20 mol per 1 kg of the polar organic solvent.

In addition, in the polymerization step, a polymerization reaction may be induced between the dihalo aromatic compound and the sulfur source in the polar organic solvent at a temperature of from 170 to 270° C., and at the point at which the conversion ratio of the dihalo aromatic compound reaches 50% or greater, a phase separation agent may be added to the polymerization reaction mixture to cause the phase separation agent to be present within the polymerization reaction system, after which the temperature of the polymerization reaction mixture is raised to a temperature of from 245 to 290° C. The polymerization reaction may be continued in a phase-separated state with a produced polymer dense phase and a produced polymer dilute phase present in the polymerization reaction system in the presence of a phase separation agent.

Furthermore, in the polymerization step, the polymerization reaction may be performed in at least a two-stage polymerization step including: a pre-stage polymerization step of performing a polymerization reaction on the dihalo aromatic compound and the sulfur source in the polar organic solvent so as to produce a polymer having a dihalo aromatic compound conversion ratio of not less than 50%, preferably from 50 to 99.5%, and more preferably from 80 to 99.3%; and a post-stage polymerization step of continuing the polymerization reaction in a state in which the mixture is phase-separated into a produced polymer dense phase and a produced polymer dilute phase in the polymerization reaction system in the presence of a phase separation agent.

More specifically, in the polymerization step, the polymerization reaction may be performed in at least a two-stage polymerization step including: a pre-stage polymerization step of performing a polymerization reaction on the dihalo aromatic compound and the sulfur source in the polar organic solvent at a temperature of from 170 to 270° C. in a state in which water is present in an amount of from 0.02 to 2 mol per 1 mol of the sulfur source (ordinarily corresponding to a state in which water is present in an amount of from 0.1 to 5.5 mol per 1 kg of the polar organic solvent) so as to produce a polymer having a dihalo aromatic compound conversion ratio of from 80 to 99.3%; and a post-stage polymerization step of adjusting the amount of water in the polymerization reaction system so that water is present in an amount of from 4 to 20 mol per 1 kg of the polar organic solvent and heating the polymer to a temperature of from 245 to 290° C. so as to continue the polymerization reaction in a state in which the mixture is phase-separated into a produced polymer dense phase and a produced polymer dilute phase in the polymerization reaction system.

The dihalo aromatic compound conversion ratio is a value calculated by the following equations. In the case where the dihalo aromatic compound is added in an excessive amount in terms of the molar ratio in comparison to the sulfur source, the conversion ratio is calculated by the following equation: conversion ratio=[[dihalo aromatic compound charged amount (mol)−dihalo aromatic compound residual amount (mol)]/[dihalo aromatic compound charged amount (mol)−dihalo aromatic compound excess amount (mol)]]×100. In other cases, the conversion ratio is calculated by the following equation: conversion ratio=[[dihalo aromatic compound charged amount (mol)−dihalo aromatic compound residual amount (mol)]/[dihalo aromatic compound charged amount (mol)]]×100.

As described above, the amount of coexisting water in the reaction system in the pre-stage polymerization step is typically within the range of from 0.02 to 2 mol, preferably from 0.05 to 1.9 mol, and more preferably from 0.5 to 1.8 mol per 1 mol of the sulfur source.

In the pre-stage polymerization step, it is typically preferable to produce a polymer (sometimes called a "prepolymer") having a melt viscosity of from 0.1 to 30 Pa·s as measured at a temperature of 310° C. and a shear speed of 1216 $sec^{-1}$.

Next, a post-stage polymerization step is performed in order to raise the degree of polymerization of the polymer (prepolymer) produced in the pre-stage polymerization step. The polymerization temperature in the post-stage polymerization step is in the range of from 245 to 290° C. When the polymerization temperature is below 245° C., it is difficult to obtain PAS having a high degree of polymerization, while when it exceeds 290° C., the PAS or the polar organic solvent may be degraded. In particular, the temperature range of from 250 to 270° C. is preferable in that a PAS having a high degree of polymerization is easy to obtain.

As described above, in the post-stage polymerization step, the phase separation agent is preferably water, an organic carboxylic acid metal salt, or a combination thereof, and it is particularly preferable to use water. It is preferable to adjust the amount of water in the polymerization reaction system by adding water as a phase separation agent so that water is present in an amount of from 4 to 20 mol, preferably from 4.1 to 15 mol, and more preferably from 4.2 to 10 mol per 1 kg of the polar organic solvent. In the post-stage polymerization step, when the amount of coexisting water in the polymerization reaction system is less than 4 mol or greater than 20 mol per 1 kg of the polar organic solvent, the degree of polymerization of the produced PAS may fall. In particular, it is preferable for the post-stage polymerization to be implemented with the amount of coexisting water in the range of 4.3 to 9 mol in that PAS with a high degree of polymerization will be obtained.

4. Post-Treatment Steps (Cooling Step, Separation Step, Washing Step, Recovery Step, and the Like):

In the PAS production method performed by applying the PAS production device of the present invention, post-treatment steps after the polymerization reaction may be performed using conventional methods. For example, after the completion of the polymerization reaction and after a slurry containing the produced PAS polymer is diluted with water as necessary while in a high-temperature state or after cooling (which may also serve as a cooling step (granulation step)), it is possible to perform a separation step of separating the PAS polymer by sieving or the like, followed by a washing step of repeatedly washing and filtering the separated PAS polymer with the same polar organic solvent as the polymerization solvent, an organic solvent such as a ketone (for example, acetone) or an alcohol (for example, methanol), or hot water, and then a recovery step or the like of recovering the PAS by drying the product thereafter. The produced PAS may be treated with acids or salts such as ammonium chloride. With this method, since it is also possible to produce a particulate polymer, a method of sieving using a screen, in which the polymer can be easily separated from byproducts, oligomers, and the like, is preferably used to separate the particulate polymer from the reaction solution.

III. Polyarylene Sulfide Production Device

The PAS production device of the present invention is a PAS production device provided with a reaction vessel equipped with one or a plurality of baffles; each baffle being supported by one or a plurality of baffle supports provided in a protruding manner on an inside wall of the reaction vessel; and at least one of the baffle supports having one or a plurality of openings passing through the baffle support. This will be explained hereinafter with reference to the drawings. Note that the drawings are schematic diagrams for facilitating an understanding of a mode of the reaction vessel or the like equipped with a baffle and a baffle support provided in the PAS production device of the present invention.

1. Reaction Vessel

The PAS production device of the present invention includes a reaction vessel 1 illustrated in the schematic cross-sectional front view of FIG. 1. As a PAS production method to be performed by applying the PAS production device of the present invention, the reaction vessel 1 is used, and at least a charging step and a polymerization step are performed in the reaction vessel 1 (therefore, the reaction vessel 1 is also called a "polymerization vessel" or a "polymerization can"). A dehydration step or a cooling step (granulation step) is performed as desired.

The same shape, structure, size, and the like as those of the reaction vessel provided and used in a conventional PAS production device may be applied to the reaction vessel 1 provided in the PAS production device of the present invention, and the reaction vessel 1 may also be formed from the same materials. That is, the reaction vessel 1 ordinarily has a structure including a cylindrical body 11, a lid 12, and a base 13. A mixing impeller 41 and a stirring shaft 42 are also ordinarily inserted into the reaction vessel 1, and one or a plurality of baffles (baffle boards) 2 are provided on the inner peripheral wall. The stirring shaft 42 is connected to an electric motor (not illustrated) disposed above the reaction vessel 1 and is rotatably driven.

Lid

The lid 12 of the reaction vessel 1 is ordinarily a bowl-shaped member connected and attached to the upper part of the cylindrical body 11, and the lid is provided with a hole into which the stirring shaft 42 of the mixing impeller 41 described below is inserted. In the reaction vessel 1 of FIG. 1, the lid 12 includes one or a plurality of supply tubes 121 (also called "supply nozzles") for loading raw material monomers or other materials (raw material monomers or other materials are also collectively called "various raw materials or the like" hereafter) into the reaction vessel 1. In addition, in order to make it possible to inspect and clean the inside of the reaction vessel 1, the lid 12 may also be provided with a lid opening or the like which can be opened and closed (also called a "manhole", a "manway", or a "hand hole" depending on the size or the like). The lid opening ordinarily has a larger diameter than that of the supply tube 121. The lid 12 is conventionally provided with the required number of baffle fixing parts for suspending and fixing baffles (baffle boards) as desired, but baffle fixing parts in the lid 12 are ordinarily unnecessary in the reaction vessel 1 of the present invention.

Base

The base 13 of the reaction vessel 1 is ordinarily a bowl-shaped member connected and attached to the lower part of the cylindrical body 11. The base 13 is ordinarily provided with a discharge tube 131 (also called a "discharge nozzle") for discharging the PAS polymer produced by a polymerization reaction and may be further provided with a supply tube for loading various raw materials or the like into the reaction vessel 1 as desired. When the reaction vessel 1 having a particular configuration provided in the PAS production device of the present invention is applied to the pre-stage polymerization step of two-stage polymerization, after the completion of the pre-stage polymerization step, the content inside the reaction vessel 1 containing the produced PAS prepolymer is removed from the discharge tube 131 after the inside of the reaction vessel 1 is reduced to a prescribed temperature and pressure as necessary, and the content is then transferred to a separate reaction vessel for performing the post-stage polymerization step of two-stage polymerization.

Cylindrical Body

The cylindrical body 11 of the reaction vessel 1 constitutes the main part of the reaction vessel 1, and the charging step, the polymerization step, and, as desired, the dehydration step are performed therein. A stirring shaft 42, a mixing impeller 41, and one or a plurality of baffles 2 (baffle boards) are disposed inside the cylindrical body 11. In a conventional reaction vessel 1, the baffles 2 are attached directly to the cylindrical body 11. However, in the PAS production device of the present invention, each baffle 2 is supported by one or a plurality of baffle supports 3 provided in a protruding manner on the inside wall of the reaction vessel 1, specifically, the inside wall of the cylindrical body 11. Therefore, the baffle supports 3 are attached to the inside wall of the cylindrical body 11.

Other Members

The reaction vessel 1 provided with the cylindrical body 11, the lid 12, and the base 13 is typically also provided with other members connected as necessary. The electric motor which rotates the stirring shaft 42 described above is one example thereof. Further, a heat exchange jacket for adjusting the temperature of the reaction vessel 1, the cylindrical body 11, in particular, may be provided so as to enclose the outer circumferential surface of the reaction vessel 1. In addition, various piping may be provided for various purposes, for example, for purposes such as the transfer of raw materials or the PAS polymer, the circulation of a heating medium and/or a coolant, or the like.

The material for forming the reaction vessel 1 of the PAS production device is required to be a material having excellent strength or chemical resistance in a high-temperature environment since the PAS polymerization reaction is performed in a high-temperature, high-pressure, and high-alkaline environment. Specific examples include corrosion-resistant metals such as titanium (or titanium alloys; same hereafter), zirconium (or zirconium alloys; same hereafter), or special austenitic steel (such as Carpenter (registered trademark)), and a laminate in which these plate-like materials or corrosion-resistant metals such as titanium or zirconium are provided on the inside surface of the reaction vessel 1, for example, a titanium-coated steel material or clad steel, may be used. The thickness or size of the plate-like material of the corrosion-resistant metal (including clad steel) is determined appropriately as necessary. This is also the same for the material forming the supply tube 121 or the like installed in the reaction vessel 1.

2. Baffle

The PAS production device of the present invention is provided with a reaction vessel 1 equipped with one or a plurality of baffles 2. As described above, the baffles 2 are used to induce a vertical stirring effect in a liquid flow generated by stirring with the mixing impeller 41 described below so as to ensure the uniformity of the compositions of the raw materials (charged raw materials or the like) or the uniformity of the composition ratio of the polymer layer and the liquid phase in a PAS polymerization method using a phase separation agent, in particular. The optimal shapes, numbers, and layout of the baffles 2 provided in the reaction vessel 1 may be selected while taking into consideration the PAS polymerization conditions, the shape of the reaction vessel 1, the shape of the mixing impeller 41, the stirring conditions, or the like. Regarding the number of baffles 2, from the perspective of the stirring efficiency or the controllability of the polymerization reaction under various conditions, a reaction vessel equipped with a plurality of baffles 2 is preferably selected, and a reaction vessel 1 equipped with from 2 to 12 or from 4 to 10 baffles 2 is more preferably selected. When multiple-tube shaped baffles or hairpin coils described below are used, the prescribed number of baffles may be formed by using 20 or more, 30 or more, or, if desired, approximately 40 capillary tubes. At least one of the baffles may include a cooling tube or a heating tube having a structure which is itself known therein. In the schematic cross-sectional plan view of FIG. 2, a plurality of baffles 2 (in FIG. 2, four baffles are illustrated; here, the arc-shaped arrow in FIG. 2 refers to the presumed rotational direction of stirring) are disposed at equal intervals on the periphery along the inside wall of the cylindrical body 11 of the reaction vessel 1, but it may also be preferable for a plurality of baffles 2 to be disposed at unequal intervals on the periphery with the objective of enhancing fluidity in the vicinity of the inside wall. In addition, the baffles 2 are disposed at positions at which they do not interfere with the mixing impeller 41 and the stirring shaft 42. The shapes of the baffles 2 are not particularly limited, and (flat) plate-shaped baffles, rod-shaped baffles, tubular baffles, multiple-tube shaped baffles (referring to a configuration in which multiple capillary tubes branching from a tube with a large diameter are gathered and arranged so as to function as a single baffle), hairpin coils (referring to a configuration in which connected capillary tubes with roughly circular cross sections are bent together and arranged so as to function as a single baffle; also called a "hairpin baffle" or a "hairpin coil baffle"), or D-type baffles may be used. In addition to the perspectives described above and compatibility with the baffle supports 3 described below, a round bar shape (which may be a tube shape or a shape in which at least part of the material is hollow) is often preferable from perspectives such as the effect of suppressing the accumulation of deposits, the fluidity of the content inside the reaction vessel, strength, and ease of production (when a cooling tube or heating tube is provided inside, in particular). Therefore, the cross-sectional shape perpendicular to the lengthwise direction of each baffle 2 is preferably roughly circular or elliptical and is more preferably roughly circular. In addition, the length in the radial direction of the reaction vessel 1 of the cross section perpendicular to the lengthwise direction of each baffle 2 is preferably from 0.4 to 15% and more preferably from 0.5 to 12% of the diameter of the reaction vessel 1. In a reaction vessel equipped with a plurality of baffles 2, all of the baffles 2 may have the same shape, or one or more may have a different shape. In addition, the baffles 2 may be disposed symmetrically or asymmetrically on the periphery along the inside wall of the cylindrical body 11 of the reaction vessel 1.

The shape of the upper end face of each baffle 2 provided in the reaction vessel 1 is not particularly limited, but from perspectives such as the effect of suppressing the accumulation of deposits or the discharge efficiency of the content inside the reaction vessel, it is preferable for at least one of the baffles 2 to have a convex shape at the top. Specific examples include shapes such as a spherical shape, a cone shape, or a rocket head shape, and the baffles more preferably have a pointed head part with a vertex angle of from 45 to 75 degrees and more preferably from 50 to 70 degrees at the upper end. The shape of the lower end face of each baffle 2 is ordinarily flat. In addition, as has been known conventionally itself, it is preferable for at least one of the baffles 2 provided in the reaction vessel 1 includes a cooling tube or a heating tube therein. Further, a corrosion-resistant metal such as titanium or zirconium is preferably used as the material for forming the baffle 2, specifically, the material for forming the portion of the baffle 2 which makes contact with the reaction solution of the reaction vessel 1. Therefore, the baffles 2 may have a laminated structure in which the outer front side thereof is formed from a titanium alloy and the inside thereof is formed from carbon steel or stainless steel.

The length of the baffles 2 is not particularly limited and may be selected appropriately from the perspectives of the stirring efficiency or the controllability of the polymerization reaction and perspectives such as compatibility with the baffle supports 3 or the effect of suppressing the accumulation of deposits. In particular, from the perspective of the effect of suppressing the accumulation of deposits, the upper end of each baffle 2 is preferably positioned below the still liquid surface. that is, the presumed liquid surface prior to the stirring of the reaction solution inside the reaction vessel 1. Therefore, the upper end of each baffle 2 is preferably positioned sufficiently below the liquid surface of the reaction solution inside the reaction vessel 1 when the liquid surface fluctuates due to stirring, that is, the liquid surface when a vortex is generated. To supplement this point, when PAS polymerization is performed by applying the PAS production device of the present invention, a vortex is generated as stirring is performed at the time of the PAS polymerization reaction in the charging step, the polymerization step, and, if necessary, the dehydration step or the like, and the liquid surface of the outside part in the radial direction of the reaction vessel 1 (corresponding to the vicinity of the inner peripheral surface of the cylindrical body 11 of the reaction vessel 1) rises (the liquid surface of the central part in the radial direction falls). Note that since the reaction vessel 1 provided in the PAS production device of the present invention is equipped with the baffles 2, the increase in the liquid surface at the time of a vortex caused by stirring is smaller than when the reaction vessel is not equipped with baffles 2, but the likelihood that the upper end of each baffle 2 will be exposed above the liquid surface is practically zero even at the time of stirring.

In the PAS production device of the present invention, the upper end of each baffle 2 is preferably positioned below the still liquid surface so that the upper end of each baffle 2 is positioned below the liquid surface even before stirring is begun, during stirring, and after the completion of stirring. As a result, there is a risk that some of the components that are dissolved in the reaction solution inside the reaction vessel 1 may evaporate and then precipitate accumulate on the upper part of each baffle 2. From the perspective of a reliable effect of suppressing the accumulation of deposits, the upper end of each baffle 2 is more preferably positioned below the still liquid surface by a distance equal to not less than 5% of the length along the lengthwise direction of the baffle 2 and is even more preferably positioned below the still liquid surface by a distance equal to not less than 7% of this length. Although also dependent on the size or the like of the reaction vessel, in many cases the upper end of each baffle 2 is preferably positioned not less than 5 cm below and more preferably positioned not less than 10 cm below the still liquid surface.

Each baffle 2 provided in the reaction vessel 1 is disposed so as to not interfere with the supply tube 121 or the like provided in the lid 12 or the base 13 of the reaction vessel 1 to interfere with the mixing impeller 41. Therefore, the length of each baffle 2 is ordinarily within the range of from 50 to 80% and in many cases within the range of from 55 to 75% of the height of the reaction vessel 1. When the length of each baffle 2 is too small, there is a risk that the stirring effect of the baffle will be insufficient, whereas when the length of each baffle 2 is too large, it may become difficult to position the upper end thereof below the still liquid surface. Note that the height of the reaction vessel 1 refers to the distance between the inside walls of the reaction vessel 1 (specifically, ordinarily the lid 12 and the base 13) on a line extending in the lengthwise direction of the baffle 2, but the height of the cylindrical body 11 is used as the height of the reaction vessel 1 for the sake of convenience.

3. Baffle Support

The PAS production device of the present invention is provided with a reaction vessel 1 equipped with one or a plurality of baffles 2, and each of the baffles 2 is supported by one or a plurality of baffle supports 3 provided in a protruding manner on the inside wall of the cylindrical body 11 of the reaction vessel 1 so as to be separated by a prescribed distance from the inside wall of the cylindrical body 11 of the reaction vessel 1, ordinarily not less than 4 mm, in many cases not less than 1 cm, and depending on the size of the reaction vessel, not less than 3 cm. That is, the baffles 2 of the PAS production device of the present invention are not directly fixed to the inside wall of the cylindrical body 11 of the reaction vessel 1 or suspended and fixed from baffle fixing parts provided on the lid 12. In the PAS production device of the present invention, each baffle 2 is supported by one or a plurality of baffle supports 3 fixed in a protruding manner to the inside wall of the cylindrical body 11 of the reaction vessel 1 (in FIG. 1, each baffle 2 is supported by two baffle supports 3 separated vertically along the lengthwise direction of the baffle 2). In order to ensure that excessive resistance is not applied to the stirring of the content inside the reaction vessel and that sufficient strength to support the baffle against the resistive force of stirring can be maintained, it is preferable for the cross-sectional area of the horizontal plane of at least one of the baffle supports 3 to be greater than the cross-sectional area of the vertical plane with respect to the direction of flow in the horizontal direction of the content inside the reaction vessel, and the cross-sectional area of the horizontal plane is more preferably at least 1.1 times the cross-sectional area of the vertical plane. In this specification, the cross-sectional area of the horizontal plane of a baffle support refers to the area of the horizontal plane of projection when the baffle support is installed in the reaction vessel, and the cross-sectional area of the vertical plane of a baffle support refers to the area of the vertical plane of projection of the baffle support related to the vertical plane with respect to the direction of flow in the horizontal direction of the content inside the reaction vessel when the baffle support is installed in the reaction vessel. The horizontal plane refers to the plane perpendicular to the direction in which gravity acts, and the vertical plane refers to the plane parallel to the direction in which gravity acts. Specifically, the baffle supports 3 are preferably disposed on the inside wall of the reaction vessel 1 so as to be parallel to the horizontal plane with a length of from 10 to 25 cm in the horizontal direction and a projection length of approximately 15 to 30 cm from the inside wall. The number of baffle supports 3 supporting each baffle 2 is ordinarily from 1 to 6 and in many cases from 2 to 4. The support method for the baffles 2 using the baffle supports 3 is not particularly limited, and a support method for the baffles 2 that is conventionally used may be employed while taking into consideration the function of supporting the baffles 2, the function of preventing the accumulation of deposits, the heat transfer performance, the release of thermal stress, and the like. For example, they may be fixed with bolts and nuts as illustrated in FIGS. 3A to 3E and FIG. 4. Note that the baffles 2 may be adjusted in position or replaced easily as desired. In addition, the baffle supports 3 preferably support each baffle 2 by being disposed so as to ordinarily be positioned below the still liquid surface. From the perspective of the function of supporting the baffles 2 or the function of preventing the accumulation of deposits, the baffle supports 3 are preferably disposed on a downstream side with respect to the flow in the horizontal direction of the content inside the reaction vessel 1 using a geometric center of gravity of a horizontal cross section of the baffle 2 as a reference.

As the material for forming the baffle supports 3, it is preferable to use the same material as the material used to form the inside wall surface of the reaction vessel 1 or the material used to form the outer front surface side of the baffles 2 from the perspective of avoiding corrosion due to galvanization between different types of metals or the generation of thermal stress due to differences in the coefficient of thermal expansion, or the ease of processing such as welding. Specifically, a corrosion-resistant metal such as titanium, zirconium, or special austenitic steel is preferably used. In addition, the shape of the baffle supports 3 may be a shape that is conventionally used, but from the perspectives of suppressing the accumulation of deposits, processability, the reliability of supporting the baffles 2, the ease of fixing to the inside wall of the cylindrical body 11 of the reaction vessel 1, and the bonding strength, a section steel shape with a channel shape, a plate shape, or a rod shape is preferable, and from the perspective of a balance between strength and weight, the baffle supports 3 are more preferably formed from channel-shaped steel with a channel shape, angle steel, H-section steel, I-section steel, rectangular steel, or round steel. At least one of the baffle supports 3 may be configured to be attachable to and detachable from the inside wall of the reaction vessel 1, specifically, the inside wall of the cylindrical body 11 of the reaction vessel 1, so as to be replaceable.

At least one of the baffle supports 3 of PAS production device of the present invention has one or a plurality of openings 31 passing through the baffle support. It is presumed that this reduces the mass or thermal capacity of the baffle support 3 and has an effect of disrupting the flow of the reaction solution generated by stirring in a complicated manner. As a result, the accumulation of deposits on the baffle supports 3 is suppressed, and the accumulation of deposits on the baffles 2 is suppressed. From the perspective of the effect of suppressing the accumulation of deposits, it is preferable for the baffle supports 3 having openings 31 passing through the baffle supports to be all of the baffle supports 3 supporting all of the baffles 2, all of the baffle supports 3 supporting at least one baffle 2, at least one baffle support 3 supporting all of the baffles 2, or any of the baffle supports 3 supporting at least one baffle 2 out of the baffle supports 3 supporting at least one baffle 2. The baffle supports 3 having openings 31 passing through the baffle supports are preferably all of the baffle supports 3 supporting all of the baffles 2 or any of the baffle supports 3 supporting all of the baffles 2 positioned on the upper side along the lengthwise direction of the baffles 2.

Figure 2:
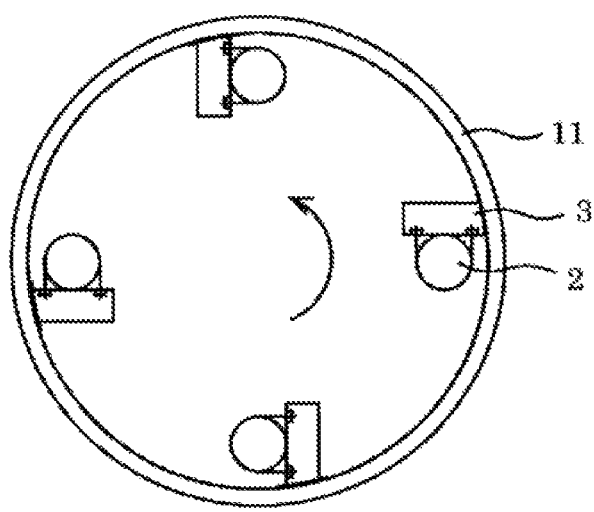
FIG. 2 is a schematic cross-sectional plan view illustrating a specific example of a reaction vessel provided in the PAS production device of the present invention.
Figure 4:
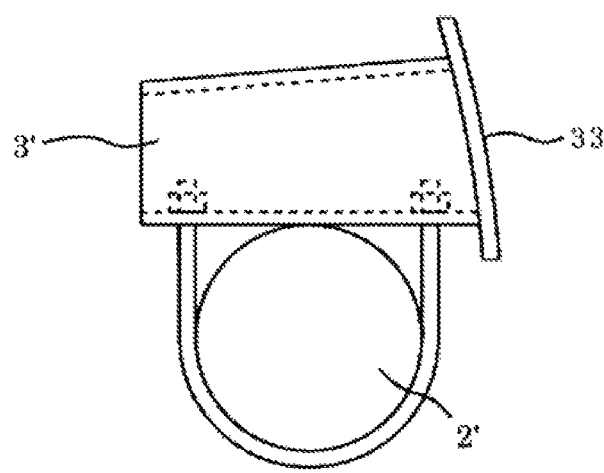
FIG. 4 is a schematic partial cross-sectional plan view illustrating a comparative example of the baffle and baffle support provided in the PAS production device of the present invention.

As illustrated in FIGS. 1 and 2, it is preferable for the cross-sectional area of the horizontal plane of at least one of the baffle supports 3 having openings 31 passing through the baffle supports to be greater than the cross-sectional area of the vertical surface from the perspective that an excessive resistance is not applied to the stirring of the content inside the reaction vessel. The cross-sectional area of the horizontal plane may be not less than 1.1 times or not less than 1.2 times the cross-sectional area of the vertical plane. For example, as described above, a baffle support 3 with a right-opening horseshoe-shaped cross section formed from channel-shaped steel is preferably disposed on the inside wall of the reaction vessel 1 so as to be parallel to the horizontal surface with a length of from 10 to 25 cm in the horizontal direction and a projection length of approximately 15 to 30 cm from the inside wall. From the perspective that no twisting or buckling occurs in the baffle support 3, the cross-sectional area of the horizontal plane of the baffle support 3 is ordinarily not greater than five times the cross-sectional area of the vertical plane. In addition, from the perspective of suppressing the accumulation of deposits, the openings 31 of the baffle supports 3 having openings 31 passing through the baffle supports are preferably openings which pass through the baffle supports 3 in the vertical direction. In this specification, the "vertical direction" refers to the direction in which gravity acts, and the "horizontal direction" refers to the direction perpendicular to the direction in which gravity acts. The opening 31 passing through the baffle support may be one opening or a plurality of openings, and the shapes and sizes of a plurality of openings may be the same or different. The shapes of the openings 31 are not particularly limited, and various shapes such as a roughly square shape, a roughly hexagonal shape, a roughly circular shape, or a roughly elliptical shape may be used. From the perspectives of the effect of suppressing the accumulation of deposits and the strength of the baffle supports 3, the total area of the opening ends of the openings 31 (one or a plurality) in the baffle supports 3 having openings 31 is preferably a ratio of from 5 to 95%, more preferably a ratio of from 10 to 92%, and even more preferably a ratio of from 15 to 90% of the area enclosed by a contour of the surfaces containing the opening ends from among the surfaces on the baffle supports 3 (area including the area of the openings 31 of surfaces including the ends of the openings 31 passing through the baffle supports 3; that is, the total of the area of the opening ends of the openings 31 and the area of the non-opening parts). In addition, from the same perspectives, at least one of the baffle supports 3 preferably has a plurality of openings 31 with a width of from 1 to 50 mm and preferably is separated with a spacing of from 2 to 40 mm. When the spacing is less than 1 mm, the strength of the baffle support 3 is insufficient, which leads to a risk that it may not be able to sufficiently support the baffles 2 when stirring is performed inside the reaction vessel, in particular. When the spacing exceeds 50 mm, there is a risk that the effect of suppressing the accumulation of deposits may not be observed. From the same perspectives, the width of the area enclosing the opening 31 of the baffle support 3 (non-opening part) is preferably within the range of from 1 to 50 mm and more preferably within the range of from 2 to 40 mm.

For example, the baffle support 3 illustrated in FIG. 3A has two roughly square-shaped openings (specifically, openings passing through the baffle support 3 in the vertical direction; this is also the same for FIGS. 3B to 3E) 311 and 312, and the spacing therebetween is preferably within the range of from 1 to 50 mm. The baffle support 3 illustrated in FIG. 3B has openings 312a and 312b separated with a spacing with a relatively narrow width, that is a spacing formed by a bridge 32, as openings corresponding to the opening 312 illustrated in FIG. 3A. The width of the bridge 32 (corresponding to the spacing of the openings) is preferably within the range of from 1 to 50 mm and more preferably within the range of from 2 to 40 mm.

The baffle support 3 illustrated in FIG. 3C corresponds to a porous plate having a roughly circular opening 313 with a relatively large diameter and multiple roughly circular openings 314 with small diameters (only nine openings are explicitly illustrated). The baffle support 3 in the form of a porous plate may also have multiple openings 314 with small diameters and shapes other than a roughly circular shape. In this case, the multiple openings 314 with shapes other than a roughly circular shape are preferably separated with a spacing of from 1 to 50 mm.

Further, the baffle support 3 may have multiple openings 31 with a ladder shape illustrated in FIG. 3D or a lattice shape illustrated in FIG. 3E (the ladder shape and lattice shape are also collectively called a "grating structure"). That is, at least one of the baffle supports 3 may have ladder-shaped or lattice-shaped openings 31. In addition, in a baffle support 3 having openings 31 with a grating structure, the width of the bridge or crosspiece corresponding to the spacing with which the openings 31 are separated is similarly preferably within the range of from 1 to 50 mm (a porous plate having lattice-shaped openings 31 separated by a bridge or crosspiece with a narrow width may also be used).

The method for forming the openings 31 of each baffle support 3 is not particularly limited, and a method ordinarily used in the processing of corrosion-resistant metals such as titanium may be used. For example, the openings may be formed by mechanical cutting such as shear cutting, thermal cutting such as plasma cutting, electric discharge machining, or laser cutting, or water jet cutting, and an optimal method may be selected out of consideration of economic efficiency from the perspectives of the range of application and dimensional precision. The method of fixing the baffle supports 3 in a protruding manner to the inside wall of the cylindrical body 11 of the reaction vessel 1 is not particularly limited. A method of joining members formed from corrosion-resistant metals such as titanium may ordinarily be used for example, a method such as inert gas arc welding, electron beam welding, resistance welding, explosive welding, brazing, diffusion bonding, or mechanical bonding may be used. As illustrated in FIGS. 3A to 3E, each baffle support 3 is preferably provided with an attachment part 33.

4. Mixing Impeller

In the PAS production device of the present invention, the mixing impeller 41 which can be preferably combined with the baffle is not particularly limited and can be selected appropriately from propeller blades, paddle blades, pitched paddle blades, turbine blades, pitched turbine blades, anchor blades, screw blades, and helical ribbon blades and used. The number of blades constituting the mixing impeller 41 may also be selected appropriately. For example, four pitched paddle blades may be preferably used. The mixing impeller 41 is rotated at a prescribed rotational speed and stirring power via the stirring shaft 42 by an electric motor (not illustrated) installed outside the reaction vessel. The rotational speed or stirring power may be changed during the step as necessary in accordance with a conventional method.

IV. Polyarylene Sulfide

With the PAS production device of the present invention, it is possible to efficiently produce a particulate PAS having excellent handleability. That is, in the PAS production device of the present invention provided with a reaction vessel equipped with baffles supported by baffle supports provided in a protruding manner on the inside wall of the reaction vessel, at least one of the baffle supports has one or a plurality of openings preferably passing through the baffle support in the vertical direction. As a result, the accumulation of deposits on the baffles or the baffle supports is suppressed, which eliminates the risk that deposits may peel off and be mixed in the produced PAS polymer, and a high-quality PAS polymer product can be obtained as a result. Specifically, it is possible to obtain a high molecular weight PAS polymer having a melt viscosity of from 50 to 3000 Pa·s and preferably from 100 to 2000 Pa·s at a temperature of 310° C. and a shear speed of 1216 sec$^{-1}$.

The PAS obtained by the method of producing PAS of the present invention can be formed into various injection molded products or extrusion molded products, such as sheets, films, fibers, and pipes, as is or after undergoing oxidative-crosslinking, alone or by blending with various inorganic fillers, fibrous fillers, and various synthetic resins, as desired. The PAS obtained by the production method of the present invention exhibits excellent color tone. Furthermore, the PAS compound obtained by the production method of the present invention produces a less amount of volatile components and is suitable for fields, such as electronic devices, where suppression of volatile components is expected.

EXAMPLES

The present invention will be more specifically described hereinafter with reference to examples and comparative examples. Note that the present invention is not limited to these examples. The method of measuring the melt viscosity of the PAS polymer is as follows.

Melt Viscosity

The melt viscosity of the PAS polymer was measured with a Capirograph 1-C manufactured by Toyo Seiki Seisaku-sho, Ltd. using approximately 20 g of dried polymer. A flat die having a diameter of 1 mm and length of 10 mmL was used as the capillary, with the temperature set at 310° C. The polymer sample was introduced into the instrument, and after the sample was held for 5 minutes, the melt viscosity at a shear rate of 1216 $sec^{-1}$ was measured (unit: Pa·s).

Example 1

PAS was produced using the PAS production device illustrated in FIG. 1 equipped with a reaction vessel 1 (diameter: 130 cm, height: 150 cm, volume: approximately 2 $m^3$) in which mixing impellers (four 45-degree pitched paddle blades in two vertical levels) 41 and a stirring shaft 42 as well as baffles 2 and baffle supports 3 are provided in a cylindrical body 11, a supply tube 121 or the like for raw materials is provided on a lid 12, a discharge tube 131 or the like for a produced PAS polymer is provided on a base 13, and a heat exchange jacket enclosing the outer circumferential surface is provided.

The baffles 2 had a circular cross section perpendicular to the length direction with a diameter of 14.5 cm (11% of the diameter of the reaction vessel 1) and a length of 100 cm (approximately 67% of the height of the reaction vessel), and four rod-shaped titanium baffles 2 having a rocket-shaped pointed head with a vertex angle of 60 degrees at the upper end were provided at equal intervals circumferentially (symmetrically) along the inside wall of the cylindrical body 11 of the reaction vessel 1. Each baffle 2 was supported by two baffle supports 3 (disposed on the downstream side from the center point of the upstream end of the baffle 2 and the downstream end of the baffle 2 with respect to the flow in the horizontal direction of the content inside the reaction vessel 1) so that upper end of each was positioned approximately 12 cm below the still liquid surface (the upper end of the baffle 2 was positioned below the still liquid surface by a distance corresponding to 12% of the length along the lengthwise direction of the baffle 2), and was disposed at a distance of 5 cm from the inside wall of the cylindrical body 11 of the reaction vessel 1. Note that a cooling tube was embedded inside the baffle 2 so as to connect to a coolant supply device outside the reaction vessel 1.

As baffle supports 3, titanium baffle supports 3 having two openings 311 and 312 passing through the baffle supports 3 in the vertical direction illustrated in FIG. 3A (the spacing of the two openings was approximately 2.5 cm, and the total area of the openings 311 and 312 was a ratio of approximately 20% of the area of the baffle supports 3; in addition, the width of the peripheral edge part enclosing the openings 311 and 312 of the baffle supports 3 was within the range of from 1 to 50 mm) were attached in a protruding manner to the inside wall of the cylindrical body 11 of the reaction vessel 1 via an attachment part 33 (length in the horizontal direction: 15 cm; projection length from inside wall: 20 cm), and as illustrated in FIG. 1, each baffle 2 was fixed with a bolt and nut as illustrated in FIG. 3A by two upper and lower baffle supports 3 (both positioned below the still liquid surface at the time of stirring).

1. Dehydration Step:

A dehydration step was performed by loading 200 kg of sodium hydrosulfide having a concentration of 62.4 mass % (2229 mol in terms of NaSH), 110 kg of sodium hydroxide having a concentration of 73.6 mass % (2024 mol), and 600 kg of N-methyl-2-pyrrolidone (NMP) into the reaction vessel 1 described above from a supply tube 121 provided in the lid 12 of the reaction vessel, replacing the inside of the reaction vessel 1 with nitrogen gas, heating to a temperature of 200° C. while stirring at 50 rpm over the course of approximately two hours, and distilling out 90 kg of water and 115 kg of NMP. The amount of hydrogen sulfide volatilized in this dehydration step was 0.57 kg (17 mol). When the amount of the sulfur source inside the reaction vessel (charged sulfur source) was calculated using this value, the amount was 2212 mol.

2. Charging Step:

After the dehydration step, the reaction vessel 1 was cooled to a temperature of 170° C., and 331.5 kg of commercially available p-dichlorobenzene (PDCB) [2255 mol, PDCB/effective S=1.02 (mol/mol)], 17 kg of water, and 289 kg of NMP were respectively loaded from the supply tube 121 provided in the lid 12 of the reaction vessel 1 to obtain a charged mixture.

3. Polymerization Step:

(1) Pre-stage polymerization: After the charged mixture was heated from a temperature of 183° C. to 220° C. and reacted for one hour while stirring the charged mixture by rotating the mixing impellers 41 provided in the reaction vessel 1, the mixture was heated to 230° C. and reacted for 1.5 hours. When a reaction mixture containing a PAS prepolymer produced in the polymerization reaction was sampled and removed from the reaction vessel 1, the PDCB conversion ratio was 95%.

(2) Post-stage polymerization: Next, the reaction mixture described above was discharged from the discharge tube 131 provided in the base 13 of the reaction vessel 1 and loaded into a separate commonly used reaction vessel for post-stage polymerization. After 50 kg of water was supplied and heated to 260° C., the mixture was reacted for five hours as post-stage polymerization in the form of phase-separated polymerization to obtain a reaction mixture containing the produced PAS polymer.

4. Post-Treatment Step

After the reaction mixture was cooled to room temperature following the completion of the polymerization reaction, the reaction mixture was passed through a 100-mesh screen (sieve opening: 150 μm) to sieve the PAS polymer (particulate polymer). The separated PAS polymer was washed three times with acetone, then washed three times with water, washed with 0.3% acetic acid aqueous solution, and washed four times with water to obtain a washed polymer. The washed polymer was dried at a temperature of 105° C. for 13 hours. The melt viscosity of the obtained particulate polymer (passed through 100 mesh) was 1350 Pa·s.

New raw materials were loaded into the reaction vessel 1, and the aforementioned PAS production operation consisting of a dehydration step, a charging step, a polymerization step (pre-stage polymerization inside the reaction vessel 1 and post-stage polymerization inside another reaction vessel), and post-treatment steps was repeated twenty times.

When each of the baffles 2 and baffle supports 3 inside the reaction vessel 1 were observed visually for the presence or absence of accumulation of deposits, no accumulation of deposits was observed in any of the baffles 2 or baffle supports 3.

Example 2

The PAS production operation was repeated twenty times in the same manner as in Example 1 using a reaction vessel 1 configured in the same manner as in Example 1 with the exception that (slightly convex) titanium rod-shaped baffles 2 not having a rocket-shaped tip with a vertex angle of 60 degrees at the upper end were used as the baffle 2, and that titanium baffle supports 3 having three openings 311, 312a and 312b passing through the baffle supports 3 in the vertical direction illustrated in FIG. 3B (the width of the bridge 32 between the openings 312a and 312b was 10 mm; the total area of the openings 311, 312a and 312b was a ratio of approximately 18% of the area of the baffle supports 3; and the width of the peripheral edge part enclosing the openings 311, 312a, and 312b of the baffle supports 3 was within the range of from 1 to 50 mm). When each of the baffles 2 and baffle supports 3 inside the reaction vessel 1 were observed visually for the presence or absence of accumulation of deposits, no accumulation of deposits was observed in any of the baffles 2 or baffle supports 3.

Comparative Example 1

The PAS production operation was repeated twenty times in the same manner as in Example 1 with the exception that titanium rods (not having a rocket-shaped pointed head part at the upper end) having a circular cross section perpendicular to the length direction with a diameter of 14.5 cm and a length of 123 cm (82% of the height of the reaction vessel) were provided at equal intervals (at symmetrical positions) circumferentially along the inside of the cylindrical body 11 of the reaction vessel 1 as baffles 2', the upper end of each baffle 2' being supported by two baffle supports 3' so as to be positioned 11 cm above the still liquid surface, and that supports made of titanium but not having openings were used as the baffle supports 3'. When each of the baffles 2' and baffle supports 3' inside the reaction vessel 1 were observed visually for the presence or absence of accumulation of deposits, the accumulation of deposits was observed on the upper end faces or back sides (the opposite sides of the surfaces in contact with the liquid flow in the peripheral direction generated by the rotation of the mixing impellers) of the baffles 2' and on the upper end faces or back sides (same meaning as described above) of the baffle supports 3'.

It can be seen from the results of Examples 1 and 2 and Comparative Example 1 that with the polyarylene sulfide production devices of Examples 1 and 2 provided with a reaction vessel equipped with one or a plurality of baffles, each baffle being supported by one or a plurality of baffle supports provided in a protruding manner on the inside wall of the reaction vessel, and at least one of the baffle supports having one or a plurality of openings preferably passing through the baffle supports in the perpendicular direction, specifically, the PAS production devices of Examples 1 and 2 in which the upper end of each baffle is positioned below the still liquid surface, the accumulation of deposits on the baffles and the baffle supports was suppressed even when the PAS production operation was repeated twenty times.

In contrast, it can be seen that with the polyarylene sulfide production device of Comparative Example 1 provided with a reaction vessel equipped with one or a plurality of baffles, each baffle being supported by one or a plurality of baffle supports provided in a protruding manner on the inside wall of the reaction vessel, but none of the baffle supports having one or a plurality of openings passing through the baffle supports, specifically, the PAS production device of Comparative Example 1 in which the upper end of each baffle is not positioned below the still liquid surface, the accumulation of deposits on the baffles and the baffle supports was observed when the PAS production operation was repeated twenty times.

INDUSTRIAL APPLICABILITY

The present invention is a PAS production device provided with a reaction vessel equipped with one or a plurality of baffles;

each baffle being supported by one or a plurality of baffle supports provided in a protruding manner on an inside wall of the reaction vessel; and at least one of the baffle supports having one or a plurality of openings preferably passing through the baffle support in the vertical direction.

This yields the effect that it is possible to provide a PAS production device in which the accumulation of deposits on a baffle (baffle board) or the like disposed inside the reaction vessel via a baffle support for the purpose of enhanced stirring efficiency is suppressed, thereby contributing to enhanced production efficiency, reduced cost of removing accumulation, and enhanced quality of the PAS product, so the industrial applicability is high.

REFERENCE SIGNS LIST

1 Reaction vessel
11 Cylindrical body
12 Lid
121 Supply tube
13 Base
131 Discharge tube
2, 2' Baffle
3, 3' Baffle support
31, 311, 312, 312a, 312b, 313, 314 Opening
32 Bridge
33 Attachment part (of baffle support)
41 Mixing impeller
42 Stirring shaft

The invention claimed is:

1. A polyarylene sulfide production device comprising a reaction vessel equipped with one or a plurality of baffles;
    each baffle being supported by one or a plurality of baffle supports provided in a protruding manner on an inside wall of the reaction vessel; and
    at least one of the baffle supports having one or a plurality of openings passing through the baffle support, wherein a cross-sectional area in a horizontal plane of at least one of the baffle supports is greater than a cross-sectional area in a vertical plane with respect to a direction of flow in a horizontal direction of a content of the reaction vessel.

2. The polyarylene sulfide production device according to claim 1 comprising a reaction vessel equipped with a plurality of baffles.

3. The polyarylene sulfide production device according to claim 1, wherein the opening passing through the baffle support is an opening passing through the baffle support in a vertical direction.

4. The polyarylene sulfide production device according to claim 1, wherein a total area of an opening end of the opening passing through the baffle support is a ratio of from 5 to 95% of an area enclosed by a contour of a surface including the opening end out of the surface of the baffle support.

5. The polyarylene sulfide production device according to claim 1, wherein a spacing of the plurality of openings is from 1 to 50 mm.

6. The polyarylene sulfide production device according to claim 1, wherein the openings passing through the baffle support have a ladder shape or a lattice shape.

7. The polyarylene sulfide production device according to claim 1, wherein the baffle support is disposed on a downstream side with respect to a flow in a horizontal direction of the content inside the reaction vessel using a geometric center of gravity of a horizontal cross section of the baffle as a reference.

8. The polyarylene sulfide production device according to claim 1, wherein at least one of the baffles has a pointed head with a vertex angle of from 45 to 75 degrees on an upper end thereof.

9. The polyarylene sulfide production device according to claim 1, wherein a cross-sectional shape perpendicular to a lengthwise direction of each baffle is a roughly circular or elliptical shape.

10. The polyarylene sulfide production device according to claim 1, wherein a length in a radial direction of the reaction vessel of a cross section perpendicular to a lengthwise direction of each baffle is from 0.4 to 15% of a diameter of the reaction vessel.

11. The polyarylene sulfide production device according to claim 1, wherein a length of each baffle is from 50 to 80% of a height of the reaction vessel.

12. The polyarylene sulfide production device according to claim 1, wherein at least one of the baffles includes a cooling tube or a heating tube therein.

13. A polyarylene sulfide production method using the polyarylene sulfide production device described in claim 1.

* * * * *